(12) United States Patent
Pukkila et al.

(10) Patent No.: US 7,308,056 B2
(45) Date of Patent: Dec. 11, 2007

(54) JOINT CHANNEL ESTIMATOR FOR SYNCHRONOUS AND ASYNCHRONOUS INTERFERENCE SUPPRESSION IN SAIC RECEIVER

(75) Inventors: Markku Pukkila, Espoo (FI); Tommy Bysted, Smoerum (DK)

(73) Assignee: Nokia Corporation

( * ) Notice: Subject to any disclaimer, the term of this patent is extended or adjusted under 35 U.S.C. 154(b) by 750 days.

(21) Appl. No.: 10/757,964

(22) Filed: Jan. 14, 2004

(65) Prior Publication Data

US 2005/0152485 A1    Jul. 14, 2005

(51) Int. Cl.
H04L 25/08    (2006.01)
(52) U.S. Cl. ........................ 375/348; 375/350
(58) Field of Classification Search ............... 375/148, 375/229, 348, 350; 455/296, 307; 708/300
See application file for complete search history.

(56) References Cited

U.S. PATENT DOCUMENTS 5,822,380 A * 10/1998 Bottomley .................. 375/347
5,933,768 A * 8/1999 Skold et al. ................. 455/296
6,088,383 A * 7/2000 Suzuki et al. ............... 375/148
2002/0159547 A1* 10/2002 Lindoff et al. .............. 375/343

OTHER PUBLICATIONS

"Indirect Cochannel Interference Cancelling" by R. Berangi et al Wireless Personal Communications, Kluwer Academic Publishers, No. 19, pp. 37-55, 2001.

* cited by examiner

Primary Examiner—David C. Payne
Assistant Examiner—Leon Flores

(57) ABSTRACT

This invention discloses improved single antenna interference cancellation (SAIC) receivers utilizing joint channel estimation for suppression of interference of co-channel signals. This invention describes the technique to perform joint channel estimation for either synchronous or asynchronous co-channel signals without a prior knowledge of the interfering training sequence or its timing position. The invented joint channel estimation can require initial detection of the desired signal and can be implemented as a multistage equalization structure.

21 Claims, 4 Drawing Sheets

JOINT CHANNEL ESTIMATOR FOR SYNCHRONOUS AND ASYNCHRONOUS INTERFERENCE SUPPRESSION IN SAIC RECEIVER

FIELD OF THE INVENTION

This invention generally relates to single antenna interference cancellation (SAIC) receivers in the field of cellular telephony and more specifically, to using joint channel estimation (JCE) for suppression of interference of either synchronous or asynchronous co-channel signals.

BACKGROUND OF THE INVENTION

Mobile terminals using cellular networks often experience interference from various sources or due to various causes, such as interference caused by the same signal arriving at the mobile terminal at slightly different times after having propagated along different paths, i.e. so-called multi-path interference. As well-known, it is often possible to cancel interfering signals at a receiver, and the prior art teaches various methods of interference cancellation (IC), both at mobile terminals and at base stations. Mobile terminals often implement so-called single antenna interference cancellation (SAIC) algorithms, since physical constraints make it difficult to use more than one antenna in providing IC.

According to the prior art, conventional single signal channel estimation methods in SAIC receivers suffer significantly in the presence of co-channel interference. It is known that the joint channel estimation technique provides much better estimates since it also takes the interfering signal into account. However, it requires known overlapping bit sequences of the desired and interfering signals. This can be guaranteed by synchronized base stations so that the delay offset at the mobile receiver is no more than a few symbols. Moreover, separate known training sequences for the co-channel signals are required. Thus the prior art does not teach how to use joint channel estimation if the interfering training sequences are unknown or if the co-channel signals are asynchronous. Using joint channel estimation with these types of signals is needed for improving interfering signal suppression and for expanding SAIC receivers to multistage equalization structures.

SUMMARY OF THE INVENTION

The object of the present invention is to provide a new methodology for improving single antenna interference cancellation (SAIC) receivers by utilizing joint channel estimation for suppression of interference of either synchronous or asynchronous co-channel signals.

According to a first aspect of the invention, a method for suppression of interfering co-channel signals, synchronous or asynchronous, in a single antenna interference cancellation (SAIC) receiver by calculating a desired impulse response estimate signal, comprising the steps of: receiving a radio signal by a receiver filter of the SAIC receiver and providing a filtered waveform signal to a joint channel estimator of a joint channel estimator module of the SAIC receiver; providing a desired bit decision signal to the joint channel estimator module; and computing the desired impulse response estimate signal by the joint channel estimator using the filtered waveform signal, the desired bit decision signal and an interfering training sequence signal and an interfering training sequence delay signal generated without prior knowledge of a training sequence of the interfering co-channel signals.

According further to the first aspect of the invention, after the step of providing the desired bit decision signal to the joint channel estimator module, the method may further comprise the steps of: computing a replica signal calculated by a replica signal generation means of the joint channel estimator module as a convolution of the desired bit decision signal and a replica impulse response of said replica signal generation means; and generating a residual signal by subtracting the replica signal from the filtered waveform signal using an adder. Further, the interfering training sequence and the interfering training sequence delay signal may be identified by calculating correlating signals of said residual signal with the candidate training sequences or training sequences convolved by a known transmission pulse shape for all possible bit positions; among said correlating signals, the maximum correlation signal is selected as interfering training sequence and the corresponding timing position as the interfering training sequence delay signal which are provided to the joint channel estimator.

Further according to the first aspect of the invention, the interfering signals may be asynchronous with a desired signal.

Still further according to the first aspect of the invention, the interfering signals may be synchronous with a desired signal.

According further to the first aspect of the invention, the desired bit decision signal may partly consist of a known training bit sequence signal.

According still further to the first aspect of the invention, after receiving the radio signal by the receiver filter, the method may further comprise the steps of: computing an initial desired impulse response estimate signal using the filtered waveform signal by a channel estimator of a first stage of the SAIC receiver; and computing the desired bit decision signal using the initial desired impulse response estimate signal and the filtered waveform signal by a single antenna interference cancellation (SAIC) detector of the first stage of the SAIC receiver. Still further, the channel estimator may be an iterative constant modulus (CM) channel estimator and SAIC detector may be a constant modulus single antenna interference cancellation (CM-SAIC) detector.

According further still to the first aspect of the invention, after the step of computing the desired impulse response estimate signal by the joint channel estimator, the method may further comprise the step of computing a further desired bit decision signal using the desired impulse response estimate signal and the filtered waveform signal by a further SAIC detector of a second stage of the SAIC receiver. Still further, the further desired bit decision signal may be an output signal of the SAIC receiver based on a predetermined criterion. Yet still further, the method may further comprise the step of providing the further desired bit decision signal to a further joint channel estimator module of a third stage of the SAIC receiver. Yet further, the channel estimator may be an iterative constant modulus (CM) channel estimator and the SAIC detector and the further SAIC detector may be constant modulus single antenna interference cancellation (CM-SAIC) detectors.

According to a second aspect of the invention, a single antenna interference cancellation (SAIC) receiver for suppression of interfering co-channel signals, both synchronous or asynchronous, by calculating a desired impulse response estimate signal, comprising: a receiver filter of the SAIC receiver, responsive to a radio signal, for providing a filtered waveform signal; a means for providing a desired bit decision signal; and a joint channel estimator of the SAIC receiver, responsive to the filtered waveform signal, to the desired bit decision signal and to an interfering training sequence signal and an interfering training sequence delay signal generated without prior knowledge of training sequence of the interfering co-channel signal, for providing the desired impulse response estimate signal.

According further to the second aspect of the invention, the means for providing a desired bit decision signal may be a first stage of the SAIC receiver and said first stage may comprise: a channel estimator, responsive to the filtered waveform signal, for providing an initial desired impulse response estimate signal; and a single antenna interference cancellation (SAIC) detector, responsive to the initial desired impulse response estimate signal, for providing the desired bit decision signal.

Further according to the second aspect of the invention, the channel estimator may be an iterative constant modulus (CM) channel estimator and SAIC detector is a constant modulus single antenna interference cancellation (CM-SAIC) detector.

Still further according to the second aspect of the invention, the SAIC receiver may further comprise at least one more stage, responsive to the desired bit decision signal and to the filtered waveform signal, for providing a further desired bit decision signal. Further, the further desired bit decision signal may be an output signal of a further SAIC detector based on a predetermined criterion. Further still the at least one more stage that is a second stage may comprise: a further SAIC detector, responsive to the desired impulse response estimate signal, for providing the further desired bit decision signal; and a joint channel estimator module, responsive to the desired bit decision signal and to the filtered waveform signal, for providing the desired impulse response estimate signal. Yet further, the channel estimator may be an iterative constant modulus (CM) channel estimator and the SAIC detector and the further SAIC detector may be constant modulus single antenna interference cancellation (CM-SAIC) detectors. Yet further still, said joint channel estimator module may comprise: a replica signal generation means, responsive to the desired bit decision signal, for providing a replica signal calculated by said replica signal generation means as a convolution of the desired bit decision signal and a replica impulse response of said replica signal generation means; an adder, for providing a residual signal by subtracting the replica signal from the filtered waveform signal; a correlation means, responsive to the residual signal, for providing the interfering training sequence and its delay signal identified by calculating correlating signals of said residual signal with the candidate training sequences or training sequences convolved by a known transmission pulse shape for all possible bit positions; among said correlating signals, the maximum correlation signal is selected as the interfering training sequence signal and the corresponding timing position as the interfering training sequence delay signal which are provided to the joint channel estimator; and a joint channel estimator, responsive to the filtered waveform signal, to the desired bit decision signal, to the interfering training sequence signal and to the interfering training sequence delay signal, for providing the desired impulse response estimate signal. Also still further, the SAIC receiver may further comprise at least one further stage, responsive to the further desired bit decision signal and to the filtered waveform signal, for providing at least one further desired bit decision signal.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

This invention describes improved single antenna interference cancellation (SAIC) receivers utilizing joint channel estimation for suppression of interference of either synchronous or asynchronous co-channel signals. Conventional (prior art) joint estimation of the desired and interfering co-channel signals provides high accuracy, but it requires known overlapping bit sequences from both desired and interfering co-channel signals. This invention describes the technique to perform joint channel estimation for either synchronous or asynchronous co-channel signals without a prior knowledge of the interfering training sequence or its timing position. The invented joint channel estimation requires initial detection of the desired signal, hence the invention can be implemented as part of the multistage equalization structure.

Figure 1:
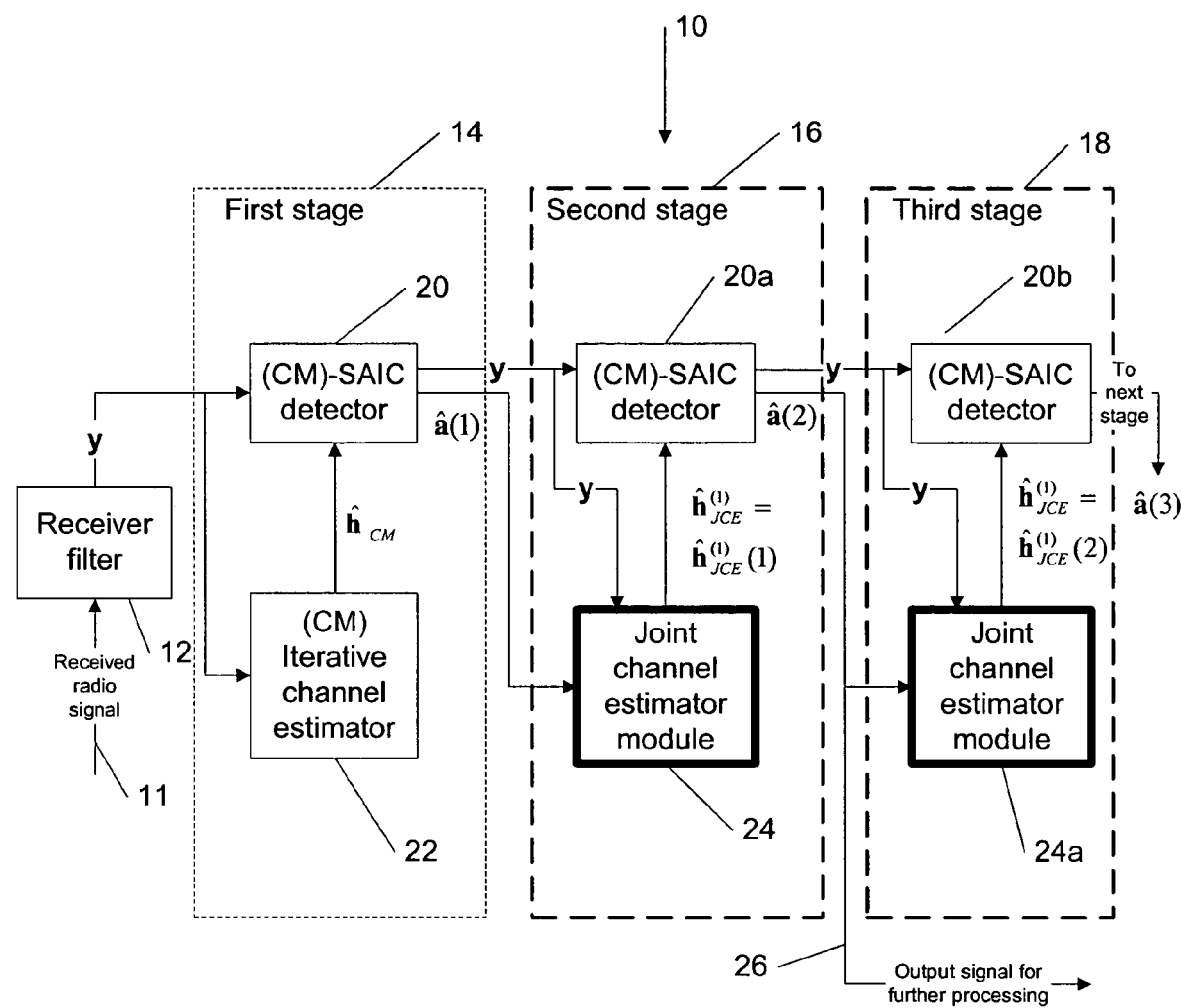
FIG. 1 is a block diagram representing a multi-stage SAIC receiver, according to the present invention.

FIG. 1 is a block diagram representing a multi-stage SAIC receiver 10, according to the present invention, in which the invention can be used in one possible scenario among others. For the presented example of FIG. 1, components from the prior art (e.g. channel estimators and SAIC detectors) use a constant modulus principle, which in general is not necessary for the implementation of the present invention as further discussed below. A receiver filter 12 (typically a finite impulse response matched filter) provides a filtered and sampled (baseband) waveform with the (received) samples indicated here as a vector y (a filtered waveform signal y) with components $y_k$. The receiver filter 12 is followed by a first stage constant modulus-single antenna interference cancellation (CM-SAIC) receiver 14, which contains an iterative constant modulus (CM) channel estimator 22 and a CM-SAIC detector 20. An initial desired impulse response estimate signal $\hat{h}_{CM}$ with components $\hat{h}_1$ is found by assuming that the received interference has a constant modulus property (constant signal power or, equivalently, constant envelope) and by minimizing a channel estimator cost function $J_{CM}(h)$ with respect to the desired impulse response signal h (i.e. with respect to the channel impulse response components $h_1$), using the iterative (CM) channel estimator 22. Next, $\hat{h}_{CM}$ is provided to the CM-SAIC detector 20. The CM-SAIC detector 20 generates a desired bit decision signal â(1) with components $\hat{a}_k(1)$ by assuming again that the received interference has the constant modulus property and by minimizing a detector cost function $J_d$ (a) with respect to a (i.e. with respect to the desired signal components $a_k$).

The performance of the iterative (CM) channel estimator 22 and CM-SAIC detector 20, as well as CM-SAIC detectors 20a, 20b, . . . , etc. of the multi-stage SAIC receiver 10 described below, is incorporated here by reference as being described in detail in co-pending U.S. patent application Ser. No. 10/439,068, filed on Aug. 13, 2003, "Method and Apparatus for Determining Components of a Channel Impulse Response for Use in SAIC Equalizer", by M. Pukkila et al. and in the article "Indirect Cochannel Interference Canceling", *Wireless Personal Communications*, Kluwer Academic Publishers, No. 19, pp. 37-55, 2001, by R. Berangi and P. Leung. On the other hand, the choice of a channel estimator or a detector of the first stage 14 is not limited to be CM based components. For instance, in some cases it may be more robust to use a conventional channel estimator or a conventional detector in the first stage 14. The same applies to SAIC detectors 20a, 20b, . . . , etc. of stages 2, 3, . . . , etc. of the multi-stage SAIC receiver 10.

The signal â(1) is provided to a second stage 16 of the multi-stage SAIC receiver 10. The structure of the second stage 16 is similar to the structure of the first stage 14 except that instead of the iterative CM channel estimator 22, a joint channel estimator module 24, a main innovation of the present invention, is used and described in detail below. The joint channel estimator module 24 provides a desired impulse response estimate signal $$\hat{h}_{JCE}^{(1)} = \hat{h}_{JCE}^{(1)}(1)$$

to a further CM-SAIC detector 20a. The further CM-SAIC detector 20a is identical to the CM-SAIC detector 20 and is incorporated here by reference as stated earlier. A further desired bit decision signal â(2) is generated by the further CM-SAIC detector 20a.

If the final stage of processing is reached based on a predetermined criterion (e.g. reaching a desired bit-error-rate), the signal â(2) becomes an output of the multi-stage SAIC receiver 10 and it is sent for further processing. Otherwise, the process continues to a third stage 18, which is identical to the second stage 16 with a further joint channel estimator module 24a and a still further CM-SAIC detector 20b. A still further desired bit decision signal â(3) is generated by the still further CM-SAIC detector 20b and the process continues until the predetermined criterion is met.

The joint channel estimation requires known overlapping bits for both desired and interfering co-channel signals. This invention describes using training sequence of the interfering signal and the overlapping bit sequence of the desired signal in the joint channel estimation. If the co-channel signals are asynchronous, it is necessary to rely on the detected bits of the desired signal (partially or totally). Therefore an initial first stage 14 (as described above) for detecting data bits is needed prior to using the joint channel estimation. Another pre-requisite information needed for the joint channel estimation include interfering training sequence and its delay offset compared to the desired signal.

Figure 2:
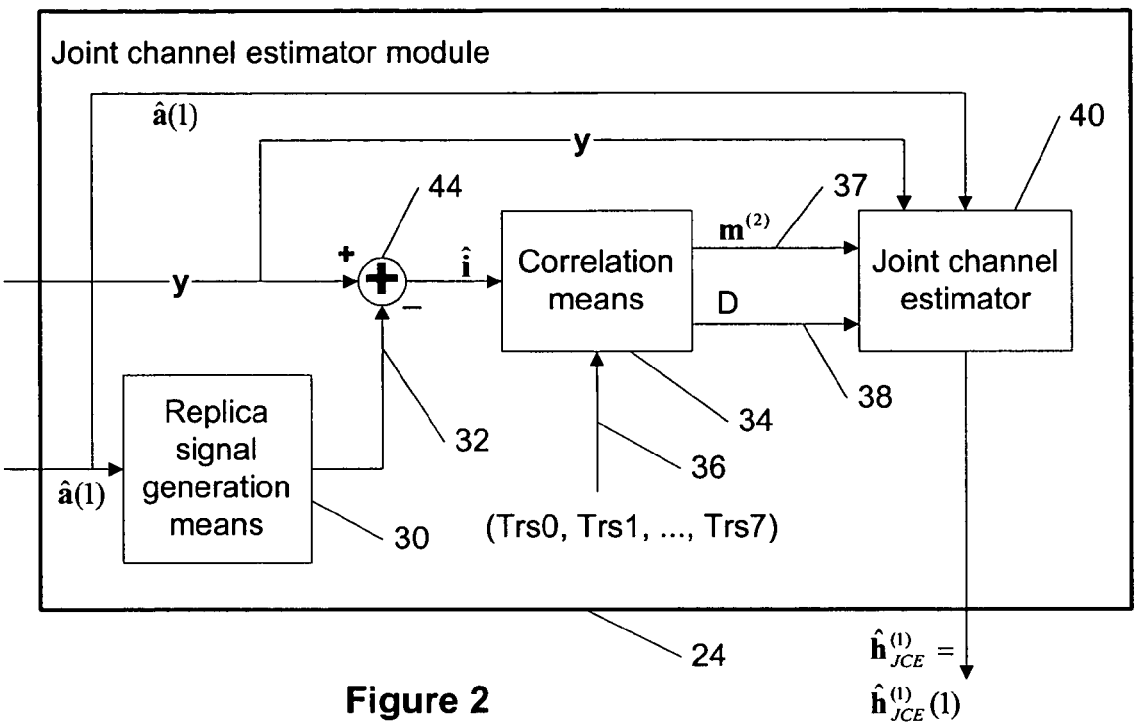
FIG. 2 is a block diagram representing a joint channel estimator module of a multi-stage SAIC receiver, according to the present invention.

The principle for estimating this information according to the present invention is shown in FIG. 2.

FIG. 2 is a block diagram representing a joint channel estimator module 24 of the second stage 16 of a multi-stage SAIC receiver 10, according to the present invention. The joint channel estimator module 24 improves the accuracy of the desired channel estimate as it also takes into account the interfering signal. First, the desired bit decision signal â(1) from the first stage 14 and the received signal y are used to determine the interfering training sequence and its timing position. In particular, the signal â(1) is used to regenerate a replica signal 32 using a replica signal generation means 30 having a replica impulse response $h_r$. The channel impulse response estimate $\hat{h}_{CM}$ from the first stage 14 can be used, i.e., $h_r = \hat{h}_{CM}$. The replica signal d(1) 32 is calculated by the replica signal generation means 30 as a convolution of the desired bit decision signal â(1) (an input signal to the block 30) and the replica impulse response $h_r$, $d(1) = \hat{a}(1) \otimes h_r$, which is then subtracted from the received signal y and thus, a residual signal î is obtained and provided to a correlation means 34. To identify an interfering training sequence signal 37 and an interfering training sequence delay signal 38 in the residual signal î, correlations with all possible candidate interfering training sequences Trs0, Trs2, . . . , Trs7 (or correlations with training sequences convolved by the transmission pulse shape) are calculated for all possible bit positions by the correlation means 34. The maximum correlation training sequence and the corresponding timing position are selected as the interfering training sequence signal ($m^{(2)}$) 37 and the interfering training sequence delay signal (D) 38 and provided to a joint channel estimator (JCE) 40.

Figure 3:
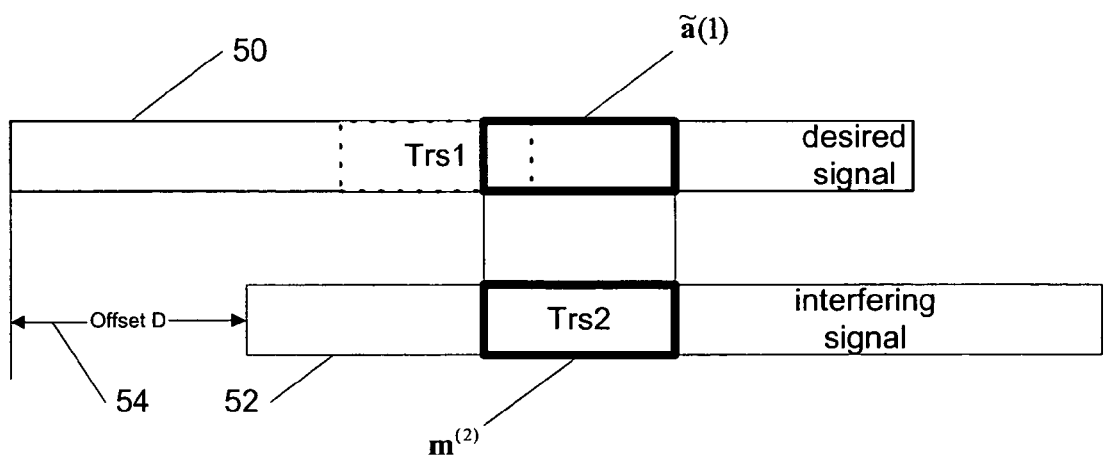
FIG. 3 is a diagram explaining a principle for joint channel estimation for asynchronous signals, according to the present invention.

Joint channel estimation by the JCE 40 is performed using the received signal (the filtered waveform signal y), the identified interfering training sequence signal 37 and the interfering training sequence delay signal 38 and the overlapping desired bits sequence signal which is demonstrated in FIG. 3. The desired bits sequence signal can be represented by the desired bit decision signal â(1) provided to the JCE 40 from the first stage 14 or by a known training bit sequence signal $m^{(1)}$.

FIG. 3 is a diagram explaining a principle for joint channel estimation for asynchronous signals, according to the present invention. In FIG. 3 the interfering signal 52 is delayed relative to a desired signal 50 by an offset D 54. Symbols â(1) and $m^{(2)}$ represent the desired bits sequence signal and the interfering training sequence signal 37, respectively. Furthermore, the symbol ã(1) can represent either the desired bit decision signal â(1) from the first stage 14 or the known training bit sequence signal $m^{(1)}$ of the desired signal. One example among others for estimation of the desired impulse response estimate signal $$\hat{h}_{JCE}^{(1)} = \hat{h}_{JCE}^{(1)}(k),$$

wherein k=1 for the second stage 16, k=2 for the third stage 18, etc., using the JCE 40, according to the present invention, is provided below.

The received signal y corresponding to the interfering training sequence is given by $$y = M^{(1)} h^{(1)} + M^{(2)} h^{(2)} + w, \quad (1)$$

where the channel tap vectors $h^{(1)}$ and $h^{(2)}$ refer to desired and interfering channels, respectively, and are given by $$h^{(i)} = \begin{bmatrix} h_0^{(i)} \\ h_1^{(i)} \\ \vdots \\ h_L^{(i)} \end{bmatrix}, i = 1, 2 \quad (2)$$

and w denotes the white Gaussian noise samples. The symbols of the desired signal are collected into the matrix $$M^{(1)} = \begin{bmatrix} \tilde{a}_{L+1}(1) & \tilde{a}_L(1) & \cdots & \tilde{a}_1(1) \\ \tilde{a}_{L+2}(1) & \tilde{a}_{L+1}(1) & & \tilde{a}_2(1) \\ \vdots & & \ddots & \vdots \\ \tilde{a}_P(1) & \tilde{a}_{P-1}(1) & \cdots & \tilde{a}_{P-L}(1) \end{bmatrix}, \quad (3)$$

wherein the symbol $\tilde{a}_1(1)$ representing the desired bits sequence signal which overlaps with the first symbol $m_1^{(2)}$ representing interfering training sequence signal 37 as shown in FIG. 3 and so on. Furthermore, the symbols $\tilde{a}(1)$ can represent either the desired bit decision signal $\hat{a}(1)$ from the first stage 14 or a known training bit sequence signal $m^{(1)}$ of the desired signal as stated above. In the special case of a perfect synchronism between co-channel signals all the desired symbols can be replaced by the training symbols. The interfering training symbols are provided by the correlation means 34 and these interfering training symbols can be used in the joint channel estimation. The symbol matrix corresponding to interfering training sequence can be expressed as follows:

$$M^{(2)} = \begin{bmatrix} m_{L+1}^{(2)} & m_L^{(2)} & \cdots & m_1^{(2)} \\ m_{L+2}^{(2)} & m_{L+1}^{(2)} & & m_2^{(2)} \\ \vdots & & \ddots & \vdots \\ m_P^{(2)} & m_{P-1}^{(2)} & \cdots & m_{P-L}^{(2)} \end{bmatrix}. \quad (4)$$

The joint maximum-likelihood (ML) channel estimation algorithm for the desired impulse response estimate signal $\hat{h}^{JCE(1)}$ (wherein $\hat{h}_{JCE}^{(1)}$ and $\hat{h}_{JCE}^{(2)}$ refer to desired and interfering channels, respectively), is given by $$\hat{h}_{JCE} = (M^H M)^{-1} M^H y, \text{ wherein} \quad (5)$$
$$\hat{h}_{JCE} = [\hat{h}_{JCE}^{(1)} \quad \hat{h}_{JCE}^{(2)}]^T \text{ and } M \equiv [M^{(1)} \quad M^{(2)}].$$

The improved estimate of the desired signal impulse response, the desired impulse response estimate signal $$\hat{h}_{JCE}^{(1)} = \hat{h}_{JCE}^{(1)}(1),$$

is provided to the second stage CM-SAIC detector 20a, as described above, which can make more reliable decisions based on the new, more accurate channel estimate. Then the process continues to the third stage 18 identical to the second stage 16, if further improvement is necessary based on the predetermined criterion described earlier, and so on.

Figure 4:
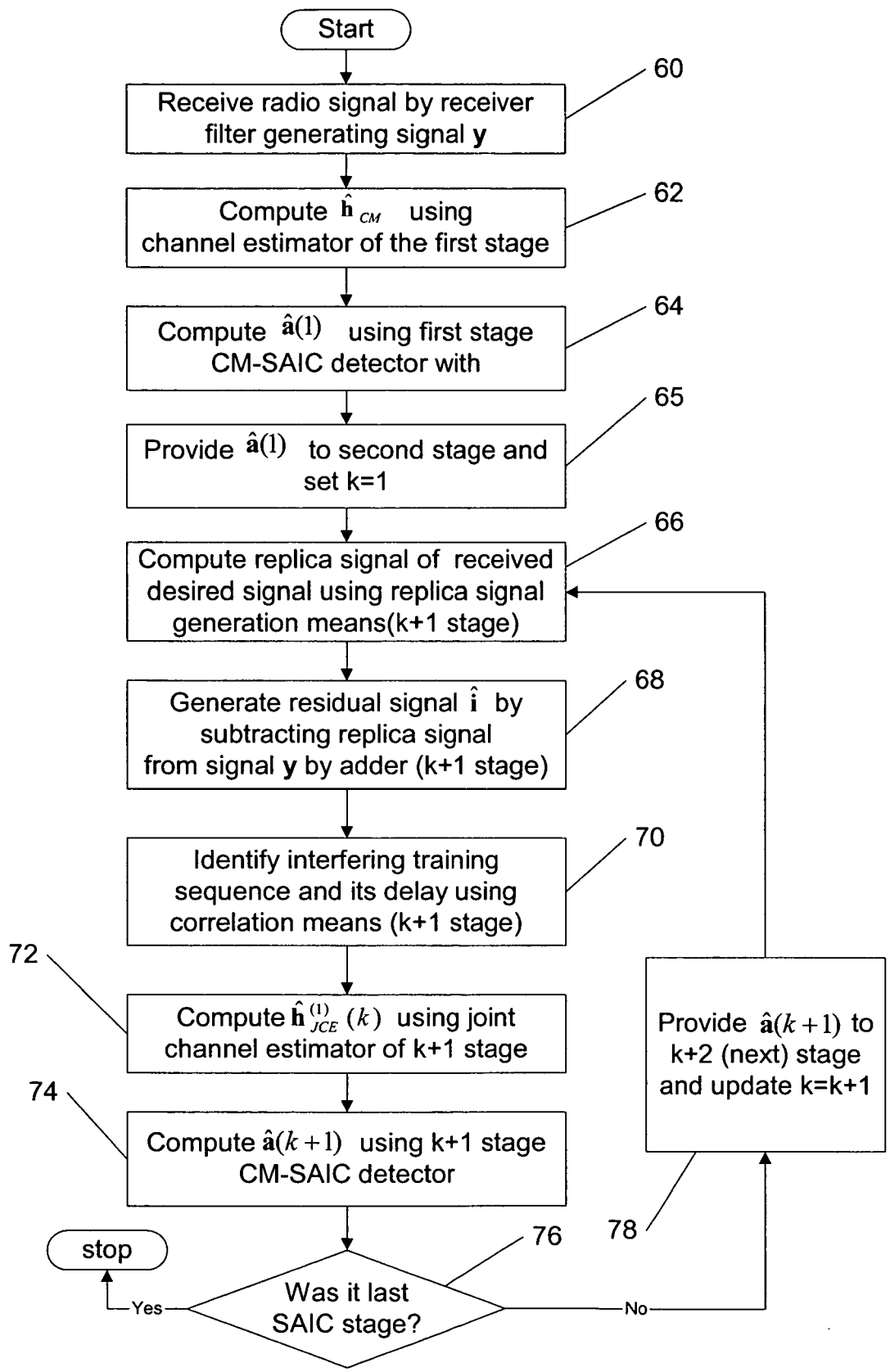
FIG. 4 is a flow chart illustrating the performance of a multi-stage SAIC receiver, according to the present invention.

FIG. 4 is a flow chart illustrating the performance of a multi-stage SAIC receiver 10 in one possible scenario among others, according to the present invention. In a method according to the present invention, in a first step 60, the radio signal is received by the receiver filter 12 generating the filtered waveform signal y. In a next step 62, the initial desired impulse response estimate signal $\hat{h}_{CM}$ is computed by the iterative (CM) channel estimator 22 of the first stage 14. In a next step 64, the desired bit decision signal $\hat{a}(1)$ is computed by the CM-SAIC detector 20 of the first stage 14. In a next step 65, the signal $\hat{a}(1)$ is provided to the second stage 16 which is acknowledged by setting an index k=1. In a next step 66, the replica signal 32 (which is the convolution of the desired bit decision signal $\hat{a}(1)$ and the replica impulse response $h_r$, $d(1)=\hat{a}(1) \otimes h_r$) is computed using the replica signal generation means 30 of the joint channel estimation module 24 of the second stage 16. In a next step 68, the residual signal $\hat{i}$ is generated by subtracting the replica signal 32 from the signal y by the adder 44 of the joint channel estimation module 24 of the second stage 16. In a next step 70, the interfering training sequence signal ($m^{(2)}$) 37 and the interfering training sequence delay signal (D) 38 are identified using the correlation means 34 of the joint channel estimation module 24 of the second stage 16. In a next step 72, the desired impulse response estimate signal $$\hat{h}_{JCE}^{(1)} = \hat{h}_{JCE}^{(1)}(1)$$

is computed using the JCE 40 of the second stage 16. In a next step 74, the further desired bit decision signal $\hat{a}(2)$ is computed by the CM-SAIC detector 20a of the second stage 16. In a next step 76, it is ascertained, whether further processing in the multi-stage SAIC receiver 10 is required based on the predetermined criterion, for example, to achieve the desired bit-error-rate. As long as no further processing is required, the desired bit decision signal $\hat{a}(2)$ becomes an output of the multi-stage SAIC receiver 10. However, if it is ascertained that further processing is required, in a next step 78, the signal $\hat{a}(2)$ is provided to the third stage 18 which is acknowledged by updating the index k=k+1 and the process goes to step 66 repeating the steps 66 through 78 until the predetermined criterion is met.

Figure 5:
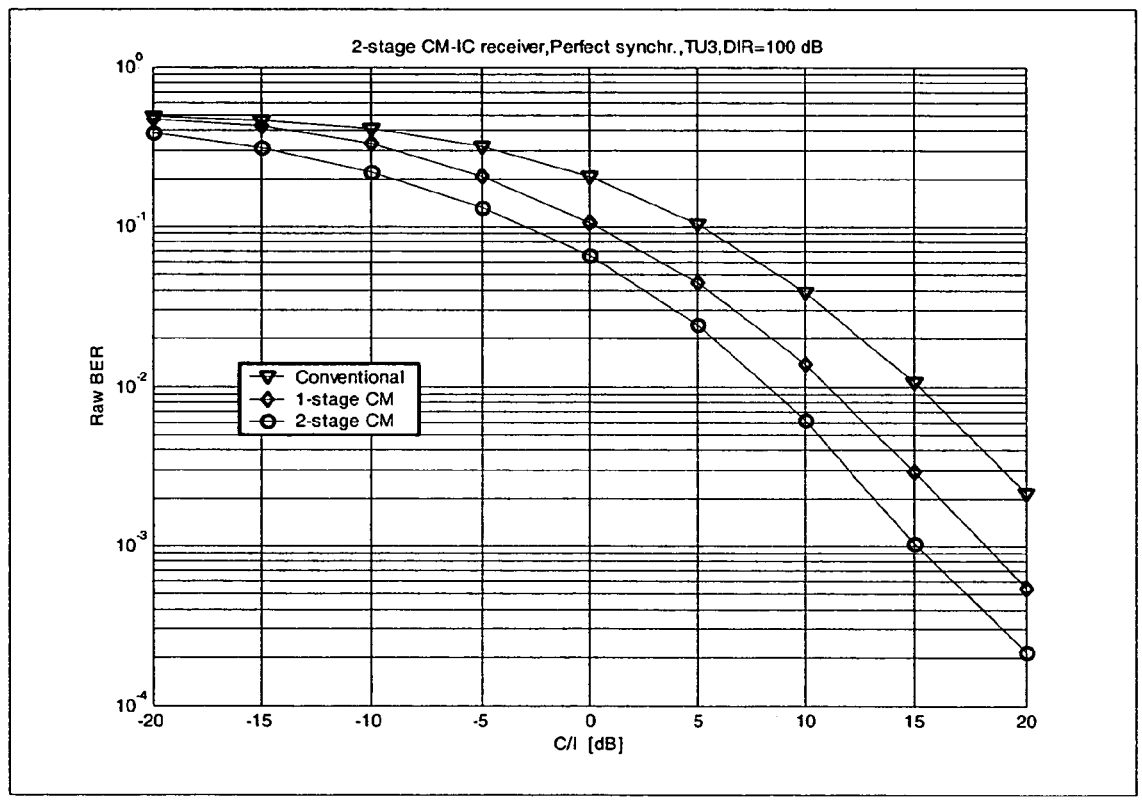
FIG. 5 is a graph demonstrating the performance of a two-stage SAIC receiver utilizing a first stage with CM-SAIC detector and iterative CM channel estimation and a second stage with joint channel estimation, according to a preferred embodiment of the present invention, compared to the performance of a one-stage CM-SAIC receiver with iterative CM channel and also compared to the performance of a conventional (non-SAIC) prior art receiver.

Finally, FIG. 5 shows a graph of a raw bit-error-rate (BER) vs. carrier-to-interference ratio (C/I) for three cases, demonstrating performance of a two-stage SAIC receiver utilizing a first stage CM-SAIC receiver with iterative CM channel estimation and a second stage with joint channel estimation, according to a preferred embodiment of the present invention, compared to the performance of a one-stage CM-SAIC receiver with an iterative CM channel and also compared to the performance of a conventional (non-SAIC) prior art receiver.

FIG. 5 shows CM-SAIC performance results in TU3 channel (Typical Urban Environment, 3 km/hr relative velocity). A single interfering signal is assumed, i.e., the dominant-to-rest of interference ratio (DIR) is 100 dB. Perfectly synchronized co-channel signals are simulated, but this information is not known in the receiver a priori. The performance of the one-stage receiver is obtained by iterative CM channel estimation and CM-SAIC detection. The performance of the two-stage CM-SAIC receiver includes improved channel estimation accuracy by the invented joint channel estimation algorithm. The simulation shows 3 dB extra link level gain by the invented joint channel estimation technique.

What is claimed is:

1. A method, comprising:

receiving a radio signal by a receiver filter of the single antenna interference cancellation receiver and providing a filtered waveform signal to a joint channel estimator (40) of a joint channel estimator module of the single antenna interference cancellation receiver;

providing a desired bit decision signal to the joint channel estimator module; and computing a desired impulse response estimate signal by the joint channel estimator using the filtered waveform signal, the desired bit decision signal, and an interfering training sequence signal and an interfering training sequence delay signal generated without prior knowledge of a training sequence of the interfering co-channel signals for suppression of interfering co-channel signals, synchronous and asynchronous, in a single antenna interference cancellation receiver.

2. The method of claim 1, after said providing the desired bit decision signal ($\hat{a}(1)$) to the joint channel estimator module, further comprising:

computing a replica signal calculated by a replica signal generation means of the joint channel estimator module as a convolution of the desired bit decision signal and a replica impulse response of said replica signal generation means; and generating a residual signal by subtracting the replica signal from the filtered waveform signal using an adder.

3. The method of claim 2, wherein the interfering training sequence and the interfering training sequence delay signal are identified by calculating correlating signals of said residual signal with the candidate training sequences or training sequences convolved by a known transmission pulse shape for all possible bit positions; among said correlating signals, the maximum correlation signal is selected as interfering training sequence and the corresponding timing position as the interfering training sequence delay signal which are provided to the joint channel estimator.

4. The method of claim 1, wherein the interfering signals are asynchronous with a desired signal.

5. The method of claim 1, wherein the interfering signals are synchronous with a desired signal.

6. The method of claim 1, wherein the desired bit decision signal partly comprises a known training bit sequence signal.

7. The method of claim 1, after receiving the radio signal by the receiver filter, further comprises:

computing an initial desired impulse response estimate signal using the filtered waveform signal by a channel estimator of a first stage of the single antenna interference cancellation receiver; and computing the desired bit decision signal using the initial desired impulse response estimate signal and the filtered waveform signal by a single antenna interference cancellation detector of the first stage of the single antenna interference cancellation receiver.

8. The method of claim 7, wherein the channel estimator is an iterative constant modulus channel estimator and single antenna interference cancellation detector is a constant modulus single antenna interference cancellation detector.

9. The method of claim 1, after said computing the desired impulse response estimate signal by the joint channel estimator, further comprising:

computing a further desired bit decision signal using the desired impulse response estimate signal and the filtered waveform signal by a further single antenna interference cancellation detector of a second stage of the single antenna interference cancellation receiver.

10. The method of claim 9, wherein the further desired bit decision signal is an output signal of the single antenna interference cancellation receiver generated using a predetermined criterion.

11. The method of claim 9, further comprising:

providing the further desired bit decision signal to a further joint channel estimator module of a third stage of the single antenna interference cancellation receiver.

12. The method of claim 9, wherein the channel estimator is an iterative constant modulus channel estimator and wherein the single antenna interference cancellation detector and the further single antenna interference cancellation detector are constant modulus single antenna interference cancellation detectors.

13. A single antenna interference cancellation receiver, comprising:

a receiver filter of the single antenna interference cancellation receiver, responsive to a radio signal, configured to provide a filtered waveform signal;

a means configured to provide a desired bit decision signal; and a joint channel estimator of the single antenna interference cancellation receiver, responsive to the filtered waveform signal, to the desired bit decision signal, and to an interfering training sequence signal and an interfering training sequence delay signal generated without prior knowledge of training sequence of the interfering co-channel signal, configured to provide a desired impulse response estimate signal, wherein said single antenna interference cancellation receiver is for suppression of interfering co-channel signals, both synchronous and asynchronous.

14. The single antenna interference cancellation receiver of claim 13, wherein the means for providing a desired bit decision signal is a first stage of the single antenna interference cancellation receiver, said first stage comprises:

a channel estimator, responsive to the filtered waveform signal, for providing configured to provide an initial desired impulse response estimate signal; and a single antenna interference cancellation detector, responsive to the initial desired impulse response estimate signal, configured to provide the desired bit decision signal.

15. The single antenna interference cancellation receiver of claim 13, wherein the channel estimator is an iterative constant modulus channel estimator and single antenna interference cancellation detector is a constant modulus single antenna interference cancellation detector.

16. The single antenna interference cancellation receiver of claim 13, further comprising at least one more stage, responsive to the desired bit decision signal and to the filtered waveform signal, configured to provide further desired bit decision signal.

17. The single antenna interference cancellation receiver of claim 16, wherein the further desired bit decision signal is an output signal of a further single antenna interference cancellation detector generated using a predetermined criterion.

18. The single antenna interference cancellation receiver of claim 16, wherein said at least one more stage that is a second stage comprises:

a further single antenna interference cancellation detector, responsive to the desired impulse response estimate signal, configured to provide the further desired bit decision signal; and a joint channel estimator moduler, responsive to the desired bit decision signal and to the filtered waveform signal, configured to provide the desired impulse response estimate signal.

19. The single antenna interference cacellation receiver of claim 18, wherein the channel estimator is an iterative constant modulus channel estimator and wherein the single antenna interference cancellation detector and the further single antenna interference cancellation detector are constant modulus single antenna interference cancellation detectors.

20. The single antenna interference cancellation receiver of claim 18, wherein said joint channel estimator module comprises:

a replica signal generation means, responsive to the desired bit decision signal, configured to provide for providing a replica signal calculated as a convolution of the desired bit decision signal and a replica impulse response of said replica signal generation means;

an adder, for providing a residual signal by subtracting the replica signal from the filtered waveform signal;

a correlation means, responsive to the residual signal, configured to provide the interfering training sequence and its delay signal identified by calculating correlating signals of said residual signal with the candidate training sequences or training sequences convolved by a known transmission pulse shape for all possible bit positions; among said correlating signals, the maximum correlation signal is selected as the interfering training sequence signal and the corresponding timing position as the interfering training sequence delay signal which are provided to the joint channel estimator; and a joint channel estimator, responsive to the filtered waveform signal, to the desired bit decision signal, to the interfering training sequence signal and to the interfering training sequence delay signal, configured to provide the desired impulse response estimate signal.

21. The single antenna interference cancellation receiver of claim 16, further comprising at least one further stage, responsive to the further desired bit decision signal and to the filtered waveform signal, configured to provide at least one further desired bit decision signal.

* * * * *

UNITED STATES PATENT AND TRADEMARK OFFICE
CERTIFICATE OF CORRECTION

| | | |
|---|---|---|
| PATENT NO. | : 7,308,056 B2 | Page 1 of 1 |
| APPLICATION NO. | : 10/757964 | |
| DATED | : December 11, 2007 | |
| INVENTOR(S) | : Markku Pukkila and Tommy Bysted | |

It is certified that error appears in the above-identified patent and that said Letters Patent is hereby corrected as shown below:

In column 10, line 44, which is claim 14, line 6, "for providing" should be deleted.

In column 11, line 5, which is claim 18, line 8, "moduler" should be --module--.

In column 11, lines 20 & 21, which is claim 20, lines 5 & 6, "for providing" should be deleted.

Signed and Sealed this

Eleventh Day of November, 2008

JON W. DUDAS
*Director of the United States Patent and Trademark Office*